US009810391B2

(12) United States Patent
Ko (10) Patent No.: US 9,810,391 B2
(45) Date of Patent: Nov. 7, 2017

(54) BENDING LIGHT DEVICE FOR VEHICLES (71) Applicant: Hyundai Motor Company, Seoul (KR)

(72) Inventor: Kwang Min Ko, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/960,076

(22) Filed: Dec. 4, 2015

(65) Prior Publication Data

US 2016/0375820 A1 Dec. 29, 2016

(30) Foreign Application Priority Data

Jun. 26, 2015 (KR) ........................ 10-2015-0090847

(51) Int. Cl.
| | | |
|---|---|---|
| *B60Q 1/00* | (2006.01) |
| *F21V 21/28* | (2006.01) |
| *F21V 21/29* | (2006.01) |
| *F21S 8/10* | (2006.01) |
| *B60Q 1/12* | (2006.01) |
| *B60Q 11/00* | (2006.01) |

(52) U.S. Cl.
CPC ............ *F21S 48/1715* (2013.01); *B60Q 1/12* (2013.01); *B60Q 11/005* (2013.01); *F21S 48/1159* (2013.01); *F21S 48/1225* (2013.01); *F21S 48/1258* (2013.01); *F21S 48/1731* (2013.01); *B60Q 2300/112* (2013.01); *B60Q 2300/114* (2013.01); *B60Q 2300/122* (2013.01); *B60Q 2300/146* (2013.01)

(58) Field of Classification Search
CPC ................ B60Q 1/08; B60Q 2300/112; B60Q 2300/114; B60Q 2300/122; B60Q 1/0005; F21S 48/1388

USPC .................. 362/465, 507, 509, 510, 539
See application file for complete search history.

(56) References Cited

U.S. PATENT DOCUMENTS 4,974,943 A * 12/1990 Noguchi ............ G02B 27/0031
359/305
6,873,446 B2 3/2005 Owen

FOREIGN PATENT DOCUMENTS

| JP | 58-007402 U | 1/1983 |
|---|---|---|
| KR | 10-1998-0043724 A | 9/1998 |
| KR | 10-1999-0011201 A | 2/1999 |
| KR | 10-2009-0014547 A | 2/2009 |
| KR | 10-2013-0004970 A | 1/2013 |
| KR | 10-1394005 B1 | 5/2014 |

* cited by examiner

*Primary Examiner* — Elmito Breval
*Assistant Examiner* — Jessica M Apenteng
(74) *Attorney, Agent, or Firm* — Morgan Lewis & Bockius LLP (57) ABSTRACT

A bending light device for a vehicle diffracting light emitted from a light source and deflecting the light at a desired angle and in a desired direction may include an ultrasonic light deflector configured to diffract light incident thereon in a selected direction by emitting an ultrasonic beam to the incident light, a light reflection unit configured to reflect light emitted from a light source to the ultrasonic light deflector, a projection lens configured to project light incident thereon after passing through the ultrasonic light deflector to radiate the light outside, and a converging lens arranged between the ultrasonic light deflector and the projection lens and configured to converge the light having passed through the ultrasonic light deflector on the projection lens.

5 Claims, 9 Drawing Sheets

FIG. 1 (Prior Art)

[ A-A CROSS-SECTION ]

[ C-C CROSS-SECTION ]

FIG. 5

[ D-D CROSS-SECTION ]

BENDING LIGHT DEVICE FOR VEHICLES

CROSS-REFERENCE TO RELATED APPLICATION

The present application claims priority to Korean Patent Application No. 10-2015-0090847 filed on Jun. 26, 2015, the entire contents of which is incorporated herein for all purposes by this reference.

BACKGROUND

Field of the Invention

The present disclosure relates to a bending light device for vehicles. More particularly, it relates to a bending light device for vehicles capable of diffracting light emitted from a light source and deflecting the light at a desired angle and in a desired direction.

Description of Related Art

In general, a headlamp is mounted to the front side of a vehicle in order to ensure safe driving by efficiently illuminating the road in front of the vehicle at night.

A conventional headlamp is typically secured to a lamp housing, and merely radiates light in a direction parallel to the centerline of the vehicle. When the vehicle travels on a curved road, the conventional headlamp merely provides illumination directly in front of the vehicle. Thus, the driver cannot properly secure clear vision when driving on a curved road.

In order to address this situation, there has recently been developed a headlamp equipped with a bending light device, in which the illumination angle is automatically controlled in the left or right direction depending on the travelling direction of the vehicle. As such, a headlight-related technology, an adaptive front lighting system (AFLS) has been developed, in which the headlights move in the left or right direction depending on the direction in which the driver turns the steering wheel, thereby illuminating the road in the travelling direction of the vehicle and securing proper vision for the driver at night.

Figure 1:
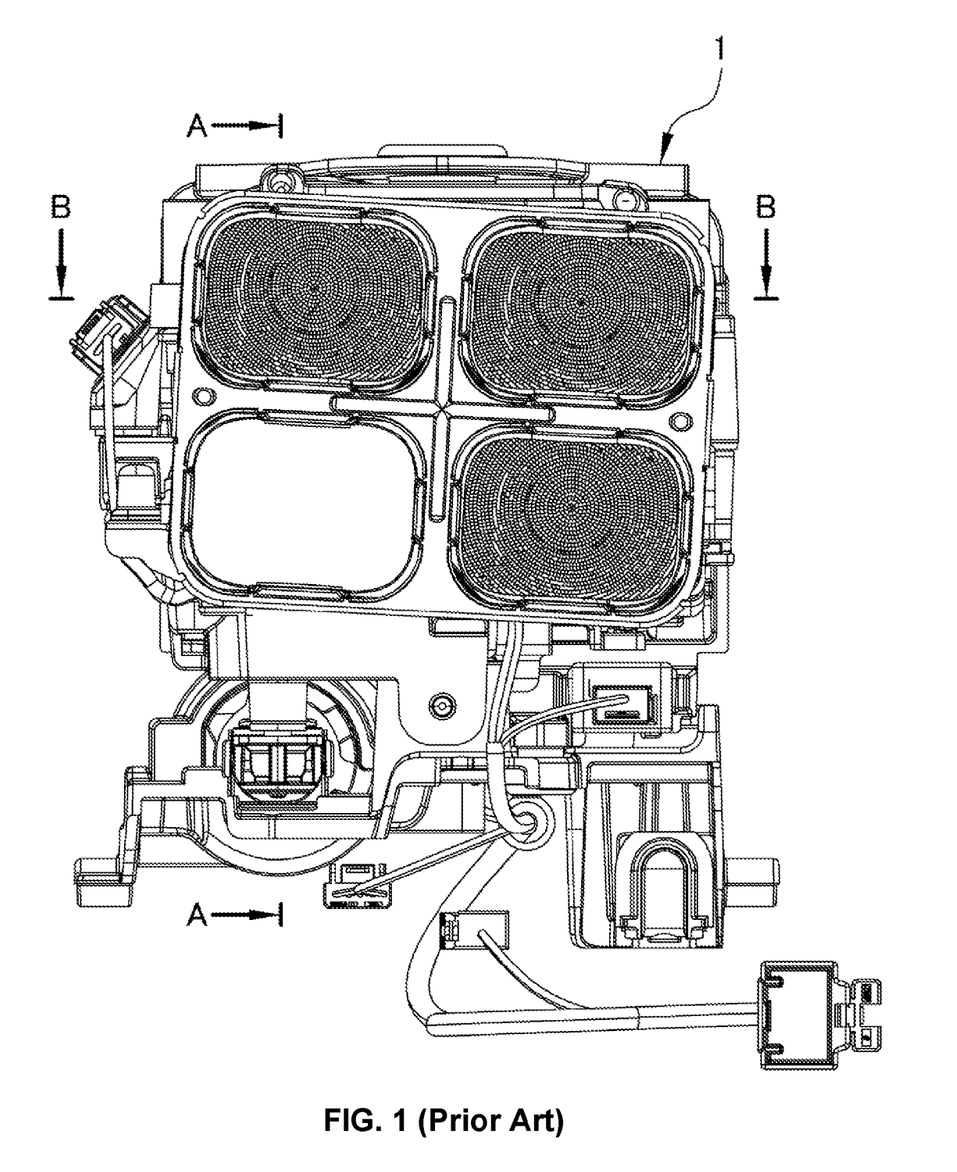
FIG. 1 is a front view illustrating a conventional bending light device.
Figure 2:
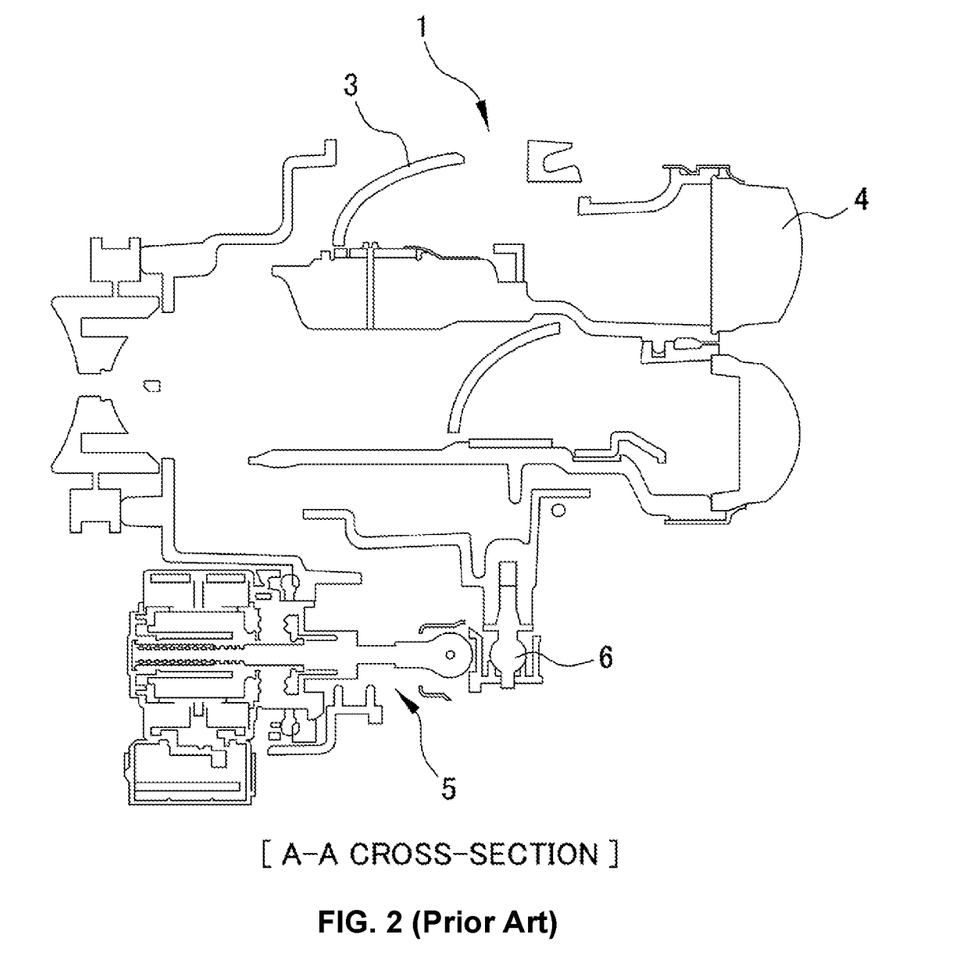
FIG. 2 is a sectional view taken along line A-A in FIG. 1.
Figure 3:
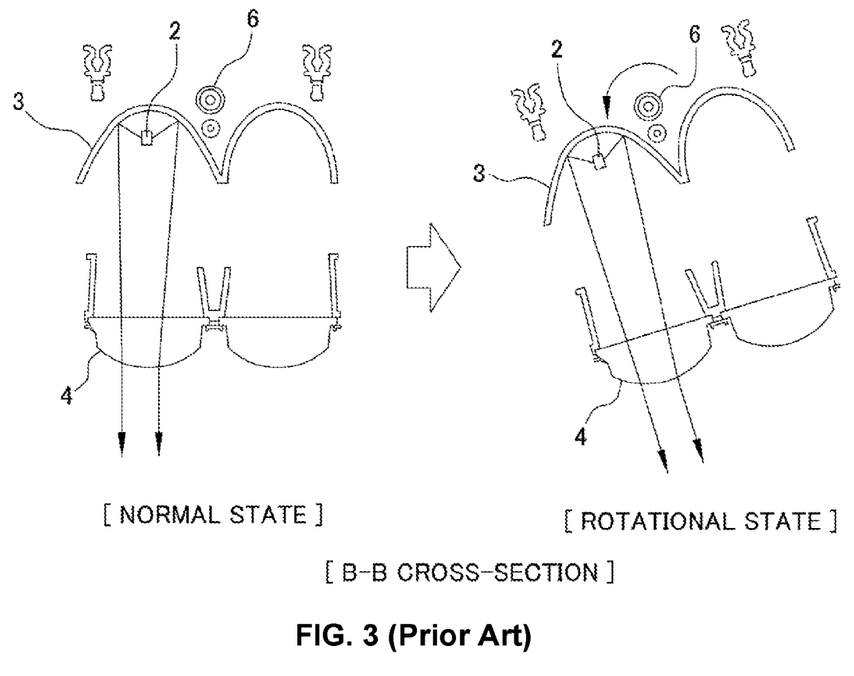
FIG. 3 is a sectional view taken along line B-B in FIG. 1.

FIG. 1 is a front view illustrating a conventional bending light device, FIG. 2 is a sectional view taken along line A-A in FIG. 1, and FIG. 3 is a sectional view taken along line B-B in FIG. 1.

Referring to FIGS. 1 through 3, a conventional bending light device is constituted such that an optical module 1 is swiveled in the left or right direction about a rotating shaft 6 by a motor 5 of an actuator. After the optical module 1 is swiveled in one direction, light from a light source 2 is reflected from a light reflection unit 3, and is projected through a projection lens 4 to illuminate the road in the direction in which the vehicle is travelling.

However, in the conventional bending light device, because the optical module 1 is swiveled about the rotating shaft 6 by the motor 5, malfunction due to mechanical defects and flickering due to inertia of the motor may occur, and the light may not be precisely controlled.

For example, interference between components including wires may occur due to the rotation of the optical module by the motor, and rotational malfunction of the optical module may occur due to damage to the rotating shaft (driving shaft), which may be caused by external shocks or vibration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bending light device for vehicles capable of diffracting light emitted from a light source of an optical module using an ultrasonic beam and deflecting the light in a desired direction.

In one aspect, the present invention provides a bending light device for vehicles including an ultrasonic light deflector configured to diffract light incident thereon in any one selected direction by emitting an ultrasonic beam to the incident light, a light reflection unit configured to reflect light emitted from a light source to the ultrasonic light deflector, a projection lens configured to project light incident thereon after passing through the ultrasonic light deflector in order to radiate the light outside, and a converging lens arranged between the ultrasonic light deflector and the projection lens and configured to converge the light having passed through the ultrasonic light deflector on the projection lens.

In an exemplary embodiment, the ultrasonic light deflector may include a first light deflection unit capable of diffracting light incident thereon in one of left and right directions, and a second light deflection unit capable of diffracting the light incident thereon in the other direction, thereby deflecting the light incident thereon in any one direction selected from the left and right directions.

In another exemplary embodiment, the bending light device may further include a headlamp control unit configured to control a frequency of the ultrasonic beam emitted from the ultrasonic light deflector, based on an angle at which the light incident on the ultrasonic light deflector is intended to be diffracted.

In still another exemplary embodiment, the headlamp control unit may selectively activate any one of the first light deflection unit and the second light deflection unit depending on a direction in which the light incident on the ultrasonic light deflector is intended to be diffracted, and may control a frequency of the ultrasonic beam emitted from the light deflection unit, selected based on an angle at which the light incident on the ultrasonic light deflector is intended to be diffracted.

In yet another exemplary embodiment, the bending light device may further include a bending light control unit configured to decide a deflection angle at which the light incident on the ultrasonic light deflector is to be diffracted and to transmit the decided deflection angle to the headlamp control unit, and the headlamp control unit may generate an acoustic modulation signal based on the deflection angle information transmitted thereto and may transmit the acoustic modulation signal to the ultrasonic light deflector, so that the ultrasonic light deflector emits an ultrasonic beam having a predetermined frequency.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the embodiment of the present invention will be described in detail with reference to the accompanying drawings to allow those skilled in the art to easily implement the present invention.

The present invention relates to a bending light device capable of realizing bending light (or diffracted light) using an ultrasonic light deflector, in which light emitted from a light source and incident on an ultrasonic light deflector is diffracted and deflected in a desired direction by an ultrasonic beam, thereby enhancing visibility to secure safety while driving at night, preventing malfunctions due to mechanical defects and flickering due to inertia of the motor, and improving response by adjustment of a deflection angle through an electroacoustic mechanism.

Figure 4:
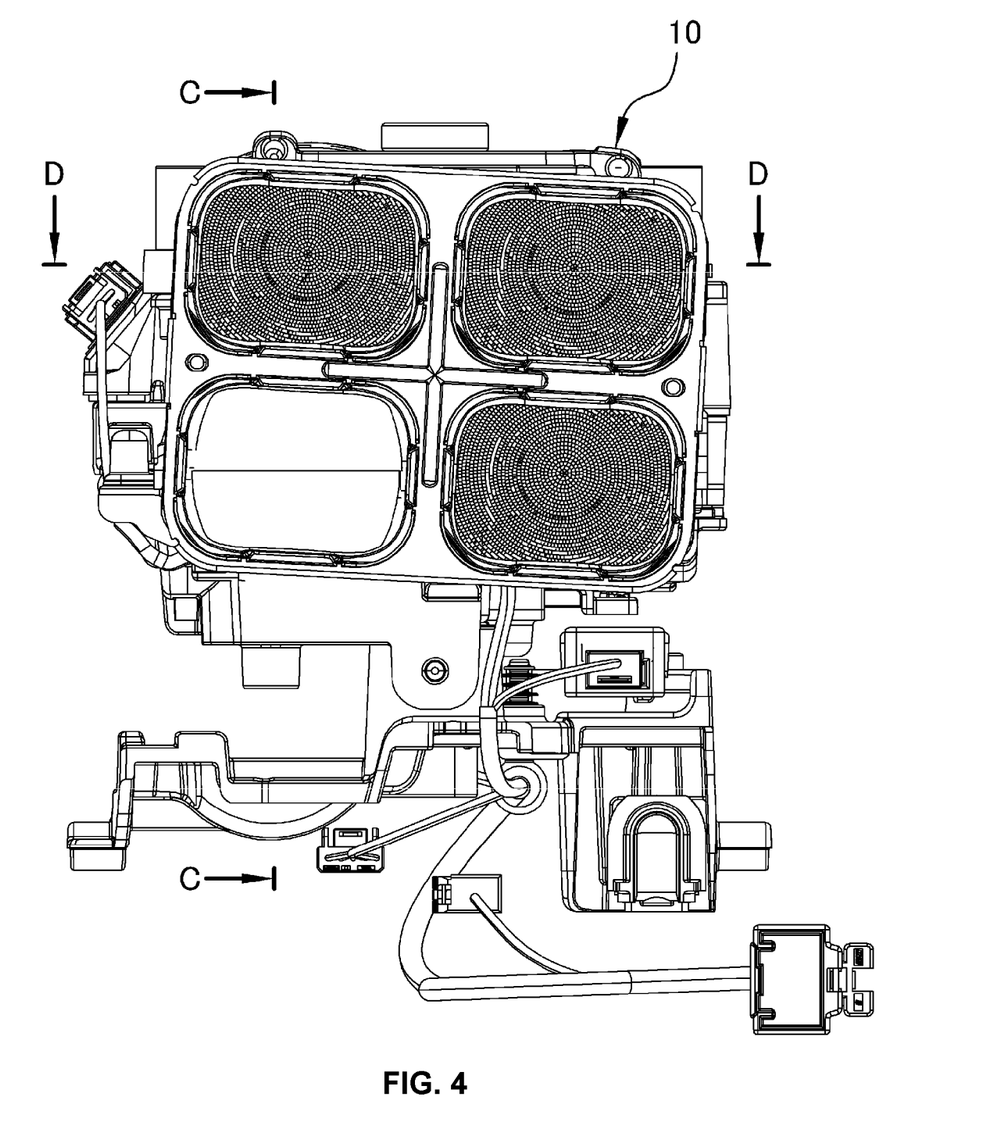
FIG. 4 is a front view illustrating a bending light device for vehicles according to an embodiment of the present invention.
Figure 5:
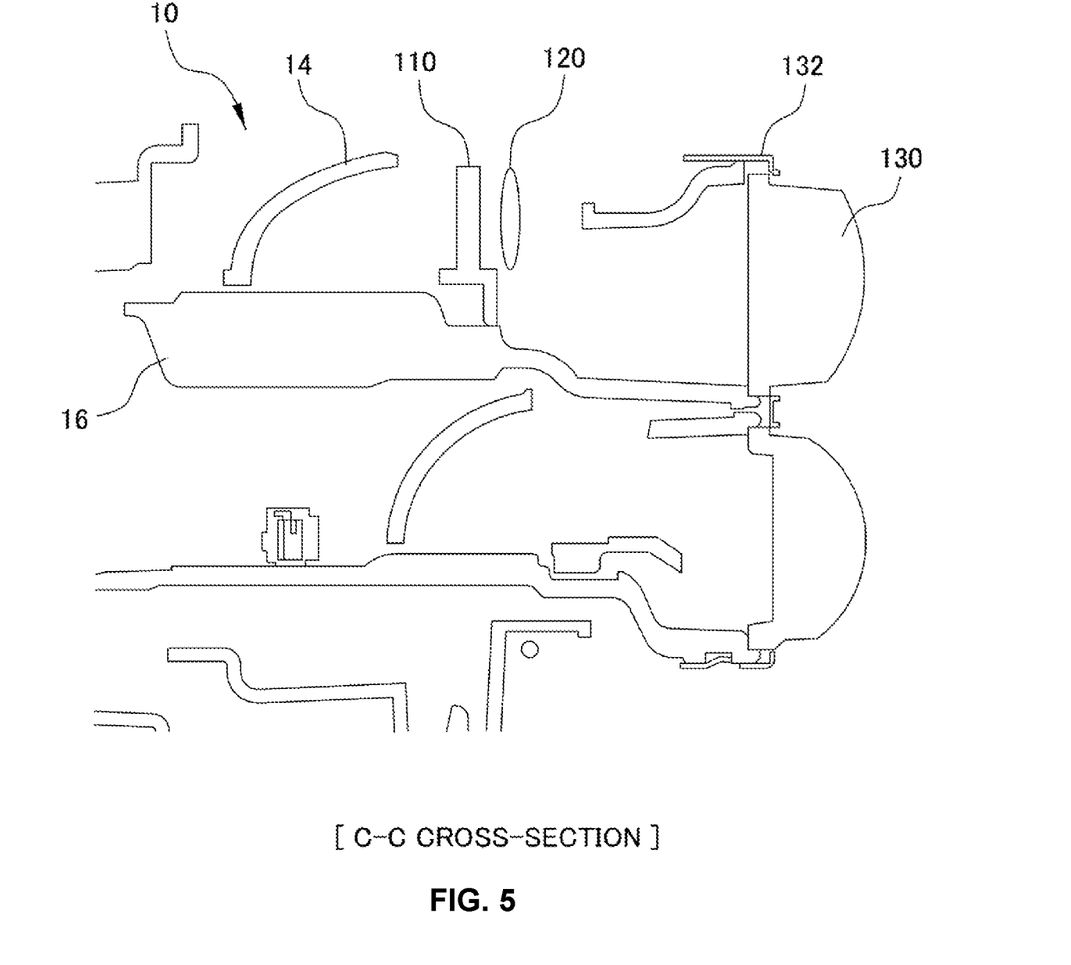
FIG. 5 is a sectional view taken along line C-C in FIG. 4.
Figure 6:
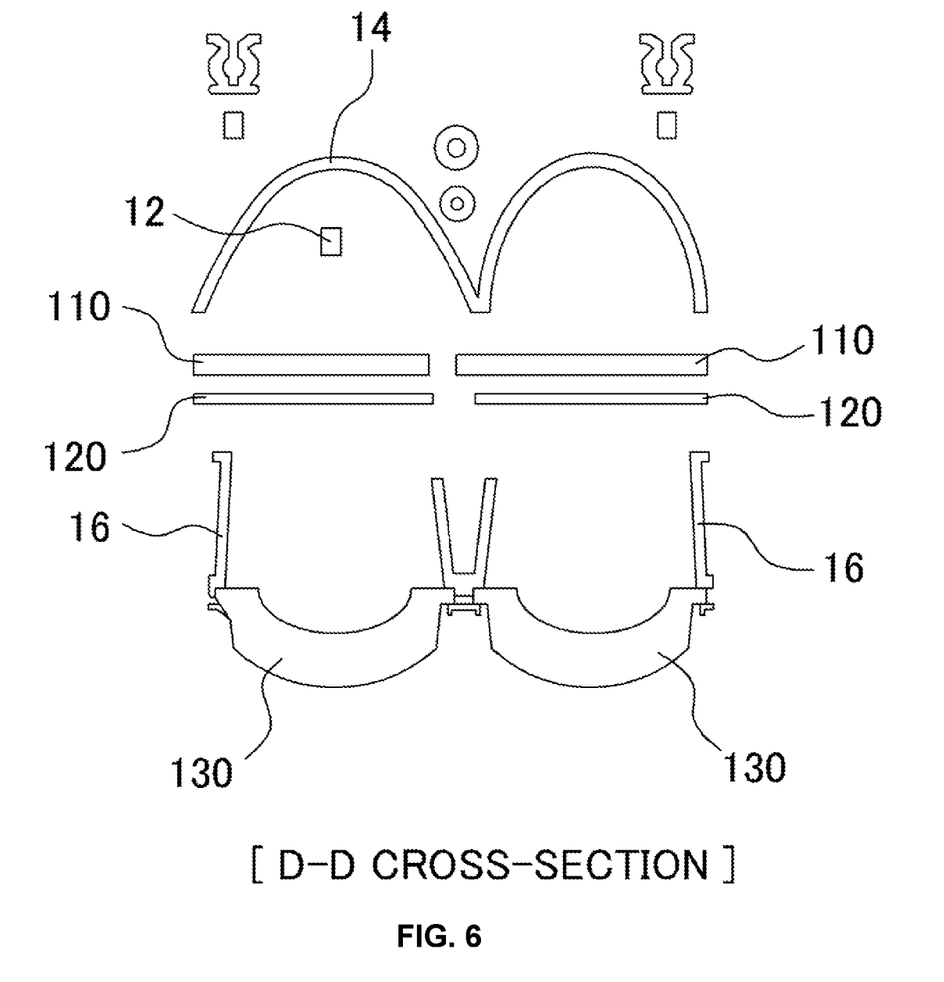
FIG. 6 is a sectional view taken along line D-D in FIG. 4.

Referring to FIGS. 4 through 6, a bending light device according to the present invention is disposed in a headlamp (headlight) and, more particularly, is arranged in front of a light source 12 of an optical module 10 that constitutes the headlamp. The bending light device includes an ultrasonic light deflector 110 disposed in front of the light source 12, a converging lens 120, and a projection lens 130.

The optical module 10 of the headlamp is constituted such that light emitted from the light source 12 is projected outside the optical module 10 through the projection lens 130 in order to illuminate the road.

The ultrasonic light deflector 110, the converging lens 120 and the projection lens 130 are securely supported on a base 16, to which the light source 12 and a light reflection unit 14 of the optical module 10 are mounted.

The ultrasonic light deflector 110 serves to deflect a light beam using an acousto-optic effect, and is arranged in front of the light source 12. If the light emitted from the light source 12 is reflected from the light reflection unit 14 and is incident on the ultrasonic light deflector 110, the ultrasonic light deflector 110 emits an ultrasonic beam according to the required deflection conditions in a direction perpendicular to the incident light (the light incident on the ultrasonic light deflector), thereby diffracting the incident light and consequently deflecting the incident light in the desired direction.

The light incident on the ultrasonic light deflector 110 is projected at a predetermined deflection angle depending on the change in the wavelength of the ultrasonic beam emitted by the ultrasonic light deflector 110, and is diffracted with respect to the angle of incidence on the ultrasonic light deflector 110, and accordingly is radiated in a deflected pattern in a left or right direction.

The light source 12 is arranged so as to emit light toward the light reflection unit 14. The light reflection unit 14 is arranged behind the light source 12, and reflects the light from the light source 12 toward the ultrasonic light deflector 110.

The converging lens 120 is arranged between the ultrasonic light deflector 110 and the projection lens 130. The converging lens 120 serves to control the phase of the light that has passed through the ultrasonic light deflector 110. In detail, the converging lens 120 modulates and controls the phase of the light diffracted by the ultrasonic light deflector 110 so that the light converges on the projection lens 130. Accordingly, the light that is diffracted in an undesired direction by the ultrasonic light deflector 110 converges on the projection lens 130.

The converging lens 120 may be embodied as a kind of multifocal convex lens, which is configured to make light that is incident in a multifocal pattern converge on one point.

Figure 7:
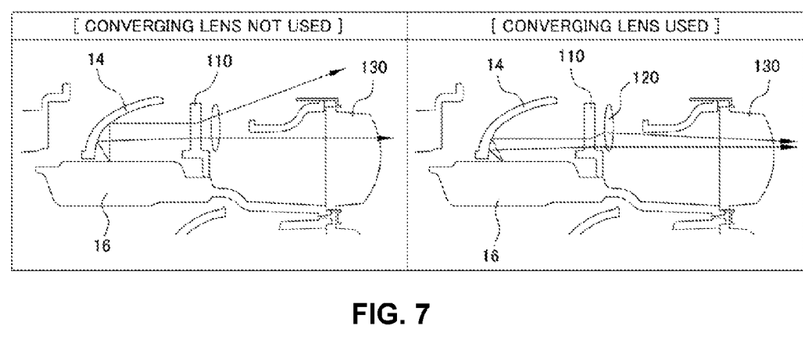
FIG. 7 is a schematic view for explaining a function of a converging lens.

As shown in FIG. 7, the converging lens 120 focuses the light, which is diffracted and deflected upward or downward by the ultrasonic light deflector 110, on the projection lens 130, and accordingly modulates the phase difference of the light due to diffraction in an undesired up or down direction, thereby adjusting the illumination difference in a light distribution area.

The projection lens 130 maintains the proceeding direction and pattern of the light incident thereon, after passing through the ultrasonic light deflector 110 and the converging lens 120, and projects the light outside. The light projected through the projection lens 130 illuminates the area in front of the vehicle.

In order to selectively deflect the light radiated in front of the vehicle from the headlamp in the left or right direction, the ultrasonic light deflector 110 is configured to emit the ultrasonic beam in any one direction selected from the left and right directions.

As is well known in the art, a general ultrasonic light deflector is a device that deflects a light beam using an acousto-optic effect, and includes an electroacoustic transducer for emitting an ultrasonic beam and an acoustic absorber for receiving the ultrasonic beam emitted from the electroacoustic transducer. The ultrasonic beam emitted from the electroacoustic transducer disposed at one side diffracts and deflects the light incident on the ultrasonic light deflector, and the ultrasonic beam, after diffracting the incident light, is absorbed in the acoustic absorber disposed at the opposite side.

Figure 8:
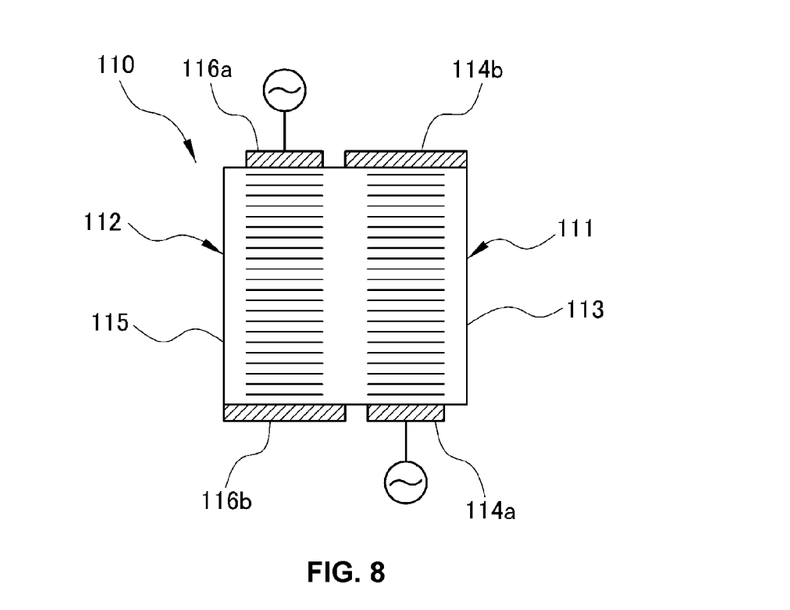
FIG. 8 is a schematic constitutional view illustrating an ultrasonic light deflector according to an embodiment of the present invention.

FIG. 8 is a schematic constitutional view illustrating the ultrasonic light deflector 110 according to an embodiment of the present invention.

As shown in FIG. 8, in order to ensure bidirectional emission, the ultrasonic light deflector 110 includes a first light deflection unit 111 capable of diffracting the incident light in one of left and right directions, and a second light deflection unit 112 capable of diffracting the incident light in the other direction. As a result, the ultrasonic light deflector 110 can deflect the incident light in any one direction selected from the left and right directions.

The first light deflection unit 111 and the second light deflection unit 112 are stacked (arranged) parallel to and adjacent to each other.

The first light deflection unit 111 includes a first light incidence part 113, through which the light reflected from the light reflection unit 14 is incident and passes, and a first light-emitting part 114a and a first light receiving part 114b which are arranged on left and right sides of the first light incidence part 113. The second light deflection unit 112 includes a second light incidence part 115, through which the light reflected from the light reflection unit 14 is incident and passes, and a second light-emitting part 116a and a second light receiving part 116b which are arranged on left and right sides of the second light incidence part 115.

The first and second light-emitting parts 114a and 116a are configured to emit the ultrasonic beam having a predetermined frequency depending on the light deflection conditions, and the first and second light receiving parts 114b and 116b are configured to receive the ultrasonic beam emitted from the first and second light-emitting parts 114a and 116a.

The first light-emitting part 114a and the first light receiving part 114b are arranged opposite to each other on left and right sides of the first light incidence part 113, and the second light-emitting part 116a and the second light receiving part 116b are arranged opposite to each other on left and right sides of the second light incidence part 115. The first light-emitting part 114a and the second light receiving part 116b are arranged parallel to each other on one of the left and right sides of the ultrasonic light deflector 110, and the second light-emitting part 116a and the first light receiving part 114b are arranged parallel to each other on the other side of the ultrasonic light deflector 110.

The ultrasonic light deflector 110 emits the ultrasonic beam having a predetermined frequency based on an emission signal transmitted from a headlamp control unit 140 (refer to FIG. 12), and diffracts the incident light.

The headlamp control unit transmits a modulation signal to any one of the first light deflection unit 111 and the second light deflection unit 112 depending on the direction in which the light incident on the ultrasonic light deflector 110 is intended to be diffracted, and selectively activates the same. At this time, depending on the angle (deflection angle) at which the light incident on the ultrasonic light deflector 110 is intended to be diffracted, the headlamp control unit controls the frequency of the ultrasonic beam emitted from the ultrasonic light deflector 110 (particularly, the light-emitting part of the light deflection unit, selected from the first light deflection unit and the second light deflection unit).

In this embodiment, the ultrasonic light deflector 110 is constituted such that the light deflection units are arranged parallel to each other, however, the constitution is not limited thereto. The ultrasonic light deflector 110 may have any constitution as long as it can deflect the incident light in any one direction selected from the left and right directions by emitting the ultrasonic beam in either the left or right direction.

Figure 9:
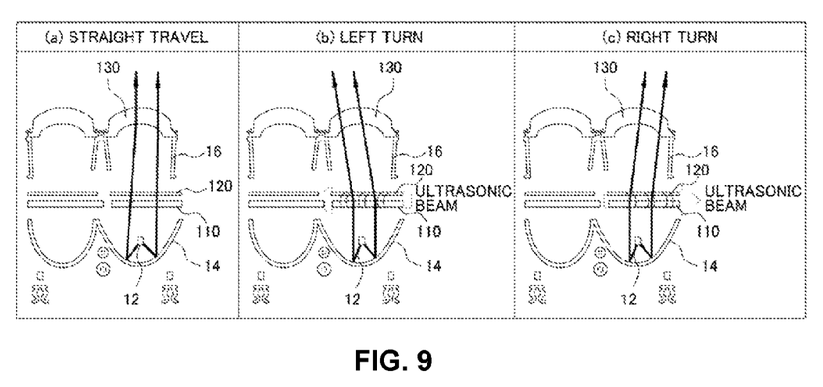
FIG. 9 is an exemplary view for explaining the operational state of the bending light device according to an embodiment of the present invention.

As shown in FIG. 9, using the ultrasonic beam emitted from the ultrasonic light deflector 110 mounted in the headlamp, the bending light device allows the light incident on the light incidence parts (113, 115) to pass through the ultrasonic light deflector without deflection while travelling straight, deflects the light radiated ahead of the vehicle from the headlamp in the left direction during a left turn, and deflects the light radiated ahead of the vehicle from the headlamp in the right direction during a right turn.

Figure 10:
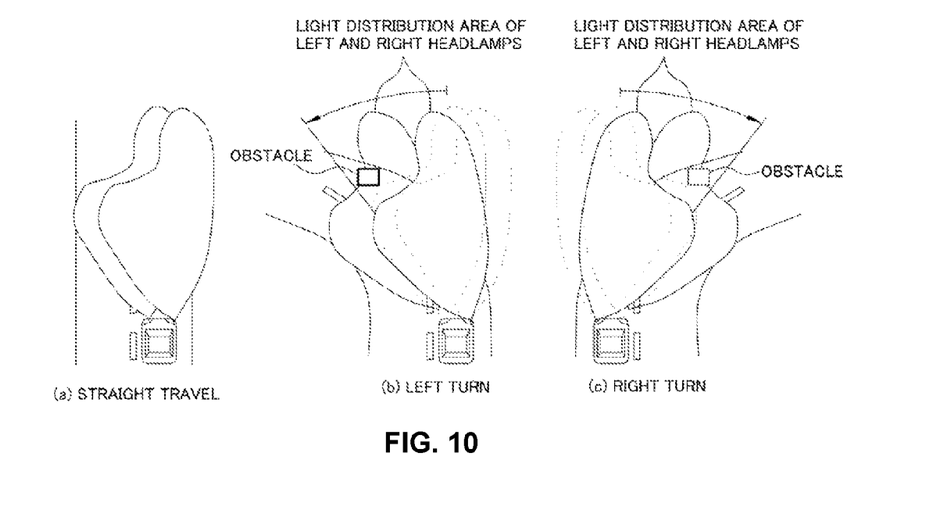
FIG. 10 is an exemplary view illustrating a light distribution area formed ahead of a vehicle according to the operation of the bending light device according to an embodiment of the present invention.

As a result, as shown in FIG. 10, since an obstacle located on a curved road comes into the light distribution area of the headlamp during the left or right turn, the driver can properly secure clear visibility of the area in front of the vehicle and obstacles in front, thereby ensuring driving safety. The area indicated by the dotted lines in FIG. 10 is the light distribution area before deflecting the light radiated from the headlamp, and the area indicated by the solid lines is the light distribution area after deflecting the light radiated from the headlamp.

Figure 12:
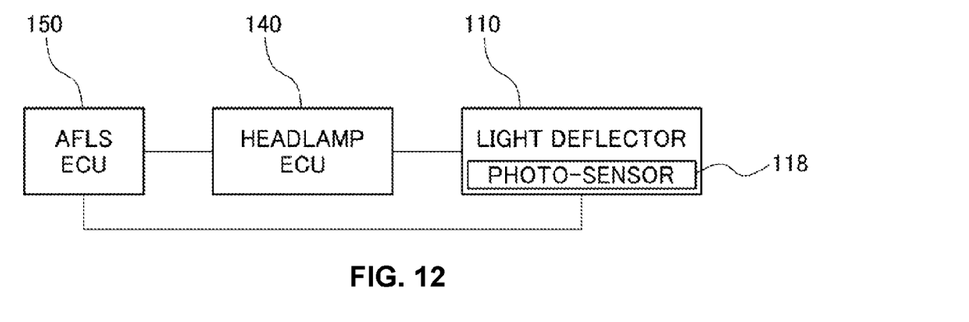
FIG. 12 is a view illustrating a constitution for controlling the operation of the bending light device according to an embodiment of the present invention.

The ultrasonic light deflector 110 emits an ultrasonic beam having a predetermined frequency using an acoustic modulation signal transmitted from the headlamp control unit 140 (refer to FIG. 12). The ultrasonic beam is emitted from the light-emitting part 114a or 116a, and has a predetermined frequency and a predetermined wavelength depending on the angle (deflection angle) at which the light incident on the ultrasonic light deflector 110 is intended to be deflected.

If the headlamp control unit 140 receives the deflection angle information from a bending light control unit 150 (AFLS ECU, refer to FIG. 12), the headlamp control unit 140 generates an acoustic modulation signal based on the deflection angle information transmitted thereto, and transmits the acoustic modulation signal to the light-emitting part 114a or 116a. The light-emitting part 114a or 116a controls the frequency and wavelength of the ultrasonic beam depending on the acoustic modulation signal transmitted thereto, and emits the ultrasonic beam.

At this time, the headlamp control unit 140 transmits the acoustic modulation signal to the light-emitting part (the first light-emitting part 114a or the second light-emitting part 116a) of the ultrasonic light deflector 110 selected depending on the direction in which the incident light is intended to be diffracted, and the light-emitting part (the first light-emitting part 114a or the second light-emitting part 116a) to which the acoustic modulation signal is transmitted emits the ultrasonic beam.

Accordingly, if the ultrasonic light deflector 110 receives the acoustic modulation signal, an ultrasonic beam having a predetermined frequency depending on the light deflection conditions is emitted into the light incidence part (the first light incidence part 113 or the second light incidence part 115), thereby deflecting the light incident on the light incidence part 113 or 115 at a desired angle and in a desired direction.

A method of controlling the bending light device for vehicles according to the present invention constituted as above will now be described with reference to FIGS. 11 and 12.

Figure 11:
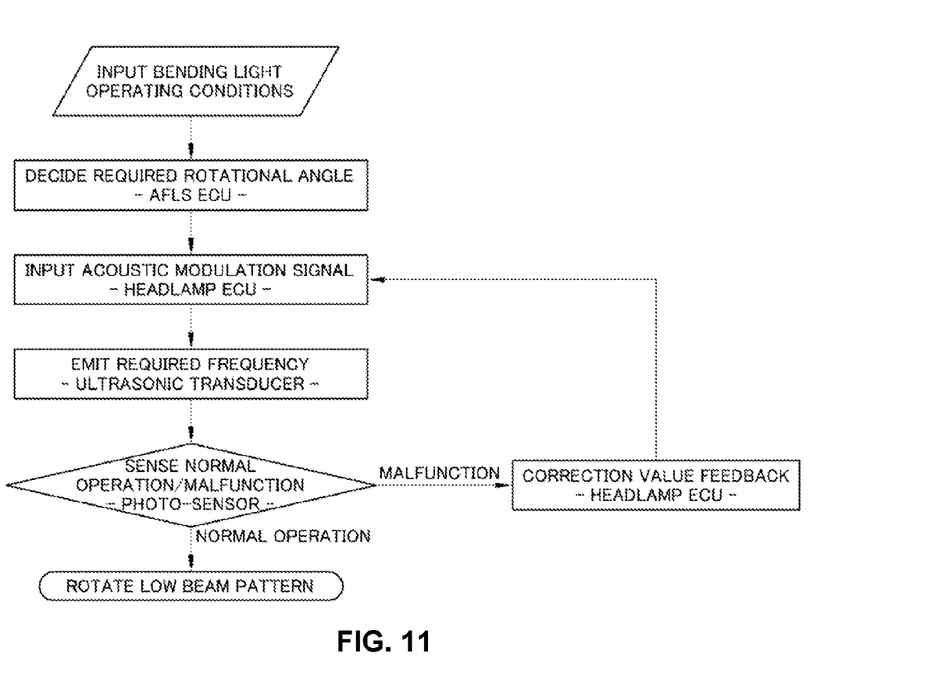
FIG. 11 is a flowchart schematically illustrating a method of controlling the operation of the bending light device according to an embodiment of the present invention.

Referring to FIGS. 11 and 12, if the operating conditions of the bending light device, i.e., the operating conditions of the ultrasonic light deflector 110, are input, the bending light control unit (AFLS ECU) 150 decides the deflection angle at which the light incident on the light incidence part 113 or 115 is to be diffracted.

Depending on the operating conditions of the ultrasonic light deflector 110, the bending light control unit (AFLS ECU) 150 decides whether to operate the ultrasonic light deflector 110 (i.e., whether to emit the ultrasonic beam) and the diffraction direction of the light incident on the light incidence part 113 or 115, and transmits the decision to the headlamp control unit 140. The bending light control unit (AFLS ECU) 150 also decides the deflection angle at which the light incident on the light incidence part 113 or 115 is to be diffracted, and transmits the decided deflection angle to the headlamp control unit 140.

The operating conditions of the ultrasonic light deflector 110 include the steering angle of the steering wheel, the vehicle speed, and the like.

The bending light control unit (AFLS ECU) 150 decides the deflection angle based on the steering angle, vehicle speed, acceleration, braking and the like, and controls the light to be diffracted at the decided deflection angle through the ultrasonic light deflector 110 and to illuminate the area toward which the vehicle is going to travel.

Next, based on the deflection angle information transmitted from the bending light control unit (AFLS ECU) 150, the headlamp control unit 140 controls the ultrasonic light deflector 110 to allow the light incident on the light incidence part 113 or 115 to be projected without diffraction or to be diffracted in any one direction selected from the left and right directions. Then, the headlamp control unit 140 generates the acoustic modulation signal depending on the decided deflection angle and transmits the same to the light-emitting part 114a or 116a of the ultrasonic light deflector 110.

As described above, if the headlamp control unit 140 receives the deflection angle information from the bending light control unit (AFLS ECU) 150, the headlamp control unit 140 generates the acoustic modulation signal based on the deflection angle information transmitted thereto, and transmits the acoustic modulation signal to the light-emitting part 114a or 116a. The light-emitting part 114a or 116a controls the frequency and wavelength of the ultrasonic beam depending on the acoustic modulation signal transmitted thereto, and emits the ultrasonic beam.

At this time, the headlamp control unit 140 transmits the acoustic modulation signal to the light-emitting part 114a or 116a selected depending on the diffraction direction of the light incident on the ultrasonic light deflector 110.

The ultrasonic beam emitted from the first light-emitting part 114a deflects the incident light in one of left and right directions, and the ultrasonic beam emitted from the second light-emitting part 116a deflects the incident light in the other direction.

After receiving the acoustic modulation signal, the light-emitting part 114a or 116a emits the ultrasonic beam, which has a predetermined frequency depending on the angle at which the incident light is intended to be deflected, in the direction perpendicular to the incident light, thereby diffracting the incident light at a predetermined angle and in a predetermined direction.

In order to determine whether the ultrasonic light deflector 110 is malfunctioning or not, the bending light control unit (AFLS ECU) 150 samples the amount of light incident on photo-sensors 118 mounted to left and right sides of an inner top portion of a projection lens holder 132 (refer to FIG. 5) and digitalizes the same.

The projection lens holder 132 functions so that the projection lens 130 having an aspherical lens type can be securely supported on the front end of the base 16.

The bending light control unit (AFLS ECU) 150 determines whether the ultrasonic light deflector 110 has realized the deflection angle, based on the amount of light measured through the photo-sensors 118. Upon determining that the ultrasonic light deflector 110 is malfunctioning, i.e., that the deflection angle is insufficient or excessive, the bending light control unit (AFLS ECU) 150 calculates a deflection angle correction value based on an error value (a lack or excess of the deflection angle), corrects the information of the pre-decided deflection angle, and transmits the corrected deflection angle information to the headlamp control unit 140.

The headlamp control unit 140 regenerates an acoustic modulation signal based on the corrected deflection angle information and transmits the same to the ultrasonic light deflector 110, thereby controlling the ultrasonic light deflector 110 to emit an ultrasonic beam having a corrected frequency.

In other words, based on the amount of light measured through the photo-sensors 118, the bending light control unit (AFLS ECU) 150 detects the light that does not converge on the projection lens 130 but diverges outside the projection lens 130, and accordingly determines whether the ultrasonic light deflector 110 is malfunctioning or not.

The bending light device for vehicles according to the present invention has the following advantages.

Since the deflection angle of the light incident on the ultrasonic light deflector is determined depending on the change in the wavelength of the ultrasonic beam emitted from the ultrasonic light deflector, the light can be diffracted at an angle different from the angle at which it is incident on the ultrasonic light deflector, and can be deflected in either the left or right direction.

Further, compared to a conventional bending light device, the present invention is optimized with a simple structure, from which a motor and other components associated therewith are omitted. Accordingly, noise due to mechanical operation and malfunction due to mechanical defects may be eliminated, and the weight of the device and the manufacturing cost may be reduced.

Furthermore, the bending light device according to the present invention may exhibit more responsive operation due to the adjustment of deflection through the electroacoustic mechanism using the ultrasonic light deflector, and the deflection may be precisely controlled by adjusting the acoustic wavelength in micro units.

While a conventional bending light device has a problem whereby rotational error occurs due to inertia of a motor because the light pattern is adjusted in the left or right direction by the operation of a motor, the bending light device according to the present invention can adjust the acoustic wavelength in micro units, thereby achieving precise adjustment of the light pattern.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bending light device for a vehicle, comprising:
   an ultrasonic light deflector configured to diffract light incident thereon in a selected direction by emitting an ultrasonic beam to the incident light;
   a light reflection unit configured to reflect light emitted from a light source to the ultrasonic light deflector; and
   a projection lens configured to project light incident thereon after passing through the ultrasonic light deflector to radiate the light outside,
   wherein the ultrasonic light deflector includes:
      a first light deflection unit diffracting light incident thereon in one of left and right directions; and
      a second light deflection unit diffracting the light incident thereon in the other direction, thereby deflecting the light incident thereon in a direction selected from the left and right directions.

2. The bending light device of claim 1, further comprising:
   a converging lens arranged between the ultrasonic light deflector and the projection lens and configured to converge the light having passed through the ultrasonic light deflector on the projection lens.

3. The bending light device of claim 1, further comprising:
   a headlamp controller configured to control a frequency of the ultrasonic beam emitted from the ultrasonic light deflector, based on an angle at which the light incident on the ultrasonic light deflector is intended to be diffracted.

4. The bending light device of claim 1, further comprising:
   a headlamp controller configured to selectively activate one of the first light deflection unit and the second light deflection unit depending on a direction in which the light incident on the ultrasonic light deflector is intended to be diffracted,
   wherein the headlamp controller controls a frequency of the ultrasonic beam emitted from the light deflection unit, selected based on an angle at which the light incident on the ultrasonic light deflector is intended to be diffracted.

5. The bending light device of claim 1, further comprising:
   a bending light controller configured to decide a deflection angle at which the light incident on the ultrasonic light deflector is to be diffracted and to transmit the decided deflection angle to the headlamp controller,
   wherein the headlamp controller generates an acoustic modulation signal based on deflection angle information transmitted thereto, and transmits the acoustic modulation signal to the ultrasonic light deflector, so that the ultrasonic light deflector emits an ultrasonic beam having a predetermined frequency.

* * * * *